APPARATUS FOR FORMING A TUNNEL

Original Filed Feb. 15, 1963 3 Sheets-Sheet 1

INVENTOR.
HENRY P. CERUTTI
BY
Kimmel & Crowell
ATTORNEYS.

APPARATUS FOR FORMING A TUNNEL

Original Filed Feb. 15, 1963 3 Sheets-Sheet 2

INVENTOR.
HENRY P. CERUTTI
BY
Kimmel & Crowell
ATTORNEYS.

APPARATUS FOR FORMING A TUNNEL

Original Filed Feb. 15, 1963 3 Sheets-Sheet 3

INVENTOR.
HENRY P. CERUTTI
BY
Kimmel & Crowell
ATTORNEYS.

United States Patent Office

Re. 26,132
Reissued Jan. 3, 1967

26,132
APPARATUS FOR FORMING A TUNNEL

Henry P. Cerutti, San Antonio, Tex., by October Corporation of Grand Prairie, Tex., assignee Original No. 3,206,824, dated Sept. 21, 1965, Ser. No. 258,730, Feb. 15, 1963. Application for reissue Nov. 26, 1965, Ser. No. 514,757
10 Claims. (Cl. 61—84)

Matter enclosed in heavy brackets [ ] appears in the original patent but forms no part of this reissue specification; matter printed in italics indicates the additions made by reissue.

This invention relates to an apparatus for forming a tunnel and relates more particularly to a combination of a traveler means having a needle beam telescopically mounted thereon and adapted to move elements of a full round form during a form setting operation and a conveyor means carried by the needle beam adapted to transport muck from a mining machine located forwardly of the traveler means to a muck car located rearwardly of the traveler means.

As conductive to a better understanding of the instant inventive concept it should be understood that in the forming of a tunnel, particularly where the earth or clay through which the tunnel will pass is comparatively soft and unstable it is necessary for the mining and concreting operations to be carried out consecutively, either under atmospheric or superatmospheric pressures. In other words, one shift of workers will mine approximately 50 feet of tunnel clay and the following shift will place the forms and pour the concrete to immediately support the area mined by the previous shift.

It has been conventional heretofore to use a collapsible full round form made of a plurality of collapsible upper arch forms and a plurality of collapsible lower invert forms carrying tracks to support the traveler means for movement through the tunnel. The portions of the forms located rearwardly of the traveler means where the concreting operation has been completed may be folded up and rolled or telescoped through the traveler means to a forward portion of the tunnel where they may be expanded and repositioned to provide means for further concreting and tracks for forward movement of the traveler means. The apparatus that is currently in use requires that each of the mining or muck cars be run through the forms and through the traveler means up to the point where it receives the muck directly from the mining or mucking machine. This necessitates the decking of the tunnel floor in the already finished section, as well as laying a deck through the forms with necessary switches. It also makes necessary the coupling and uncoupling of cars so that one car at a time can be brought up to the mining machine to receive muck. The singly loaded muck cars are then pushed rearwardly by hand through the traveler means, through the forms that have been concreted, back on the decked-over tunnel floor and switched singly to be made up into a train which is then hauled back to the portion or shaft for lifting out of the tunnel.

It is a primary object of the instant invention to provide an improved apparatus for forming a tunnel which is sturdy and durable in construction, reliable and efficient in operation, and relatively simple and inexpensive to manufacture, assemble, utilize and maintain.

Another object of this invention is the provision of a tunnel forming apparatus wherein the traveler means includes a telescopically mounted needle beam means which may serve as a conveyor during the mining operation and without necessitating structural changes, may also serve as a means to move and position the form elements during the form setting operation.

A further object of this invention is the provision of a needle beam conveyor which may be permanently mounted on a conventional traveler means and which will not increase either the lateral or vertical space necessary for movement of the traveler means through the tunnel.

A still further object of the instant invention is the provision of an improved tunnel forming apparatus including a traveler means having a needle beam conveyor made up of a pair of laterally spaced "I" beams slidably supported on the traveler means for telescopic movement with respect thereto and a conveyor means mounted between the "I" beams for transporting muck through the traveler means from the mining machine to the muck cars.

Another object of this invention is to provide an apparatus of the type described wherein the needle beam slidingly supports a hoist means adapted to collapse the lower or invert portions of said full round form, transport the same forwardly through the traveler means and reposition the invert forms for further concreting operations.

Another object of this invention is the provision of such an apparatus wherein the traveler means includes hydraulic cylinders adapted to strip the upper or arch portions of the full round form, transport the same forwardly in the tunnel and reposition the arch forms for further concreting operation.

A further object of the instant invention is the provision of an auxiliary conveyor means to transport the muck from the mining machine to the needle beam conveyor.

Another object of this invention is to provide an auxiliary conveyor means to transport the muck from the needle beam conveyor to the forward end of a line of muck cars.

Other and further objects reside in the combination of elements, arrangement of parts and features of construction.

Still other objects will in part be obvious and in part be pointed out as the description of the invention proceeds and as shown in the accompanying drawings, wherein.

Figure 7:
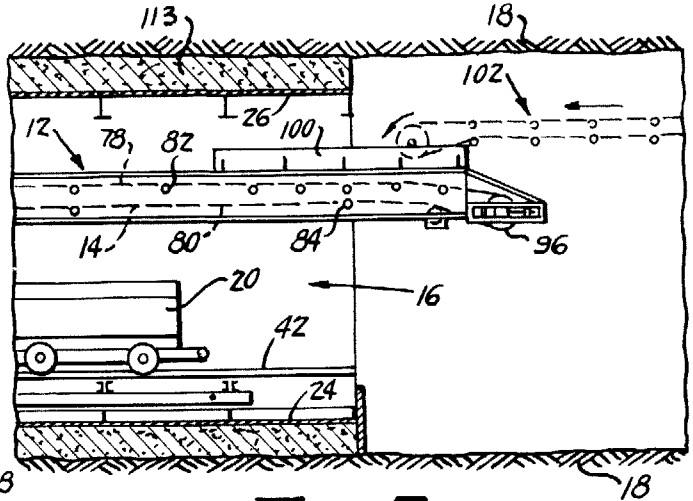
Figure 6:
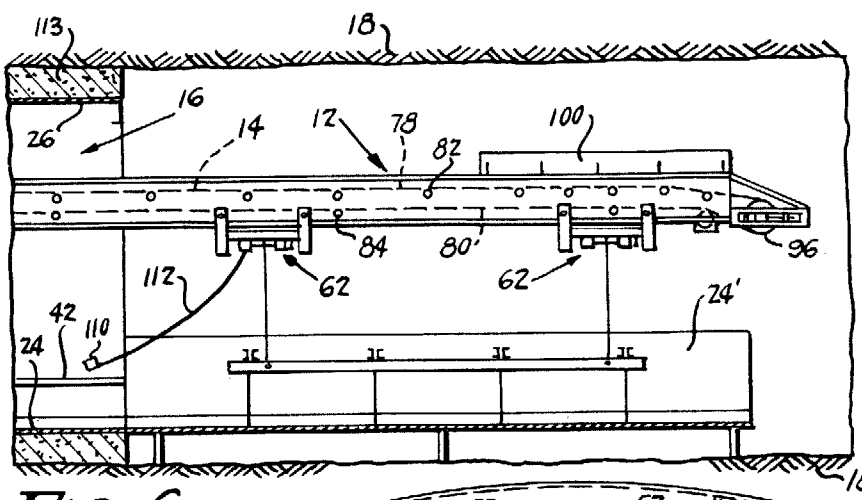
FIGURE 6 is an enlarged fragmentary side elevational view of the forward end portion of the needle beam means including a conveyor means in accordance with the instant inventive concept, showing the repositioning of an invert form for further concreting operation.
Figure 8:
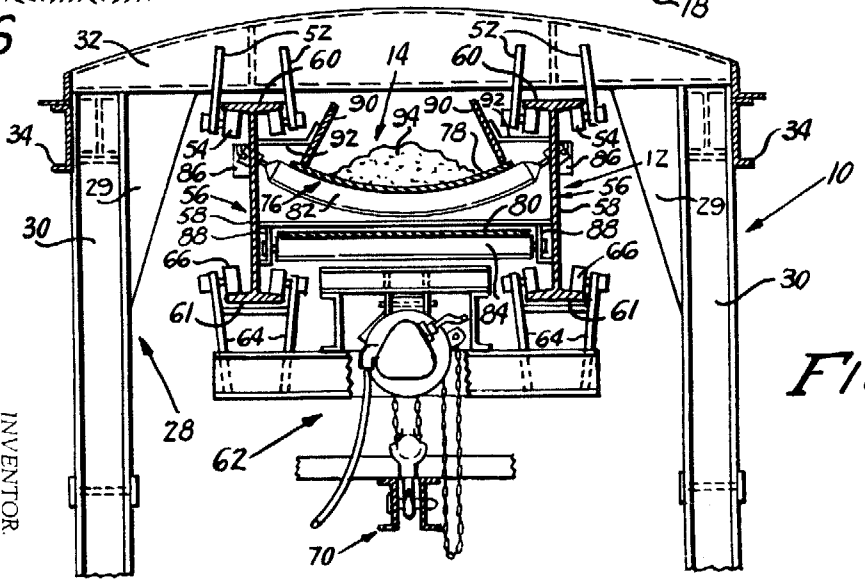

FIGURE 7 is an enlarged fragmentary side elevational view of the forward end portion of the needle beam means, similar to FIGURE 6, but showing the use of the conveyor means for transporting muck through the traveler means including in dotted lines an auxiliary conveyor for carrying the muck from a mining machine to the needle beam conveyor; and FIGURE 8 is an enlarged transverse cross-sectional view through a portion of the traveler means showing the detailed construction of the needle beam means and its associated conveyor means in accordance wtih the instant invention.

Like reference characters refer to like parts throughout the several views of the drawings.

Referring now to the drawings, reference numeral 10 generally designates a tunnel-shaped carriage or traveler means having a needle beam means 12 telescopically mounted thereon, which needle beam means 12 carries a conveyor means 14 in accordance with the instant invention. The tunnel being formed is indicated generally by the reference numeral 16 and is shown as curved in FIGURE 1 merely to illustrate that the tunnel may be of any desired shape. Earth or muck 18 is removed forwardly or to the right of the traveler means 10 by a mucking or mining machine (not shown). A plurality of muck cars 20 are provided to remove the mined earth or muck from the tunnel 16 by transporting the same rearwardly over the completed portion of the tunnel floor to the portal or shaft (not shown) for lifting out of the tunnel 16.

The full round form is indicated generally at 22 and is comprised of a plurality of collapsible lower invert arch form members and a plurality of collapsible upper arch form elements, shown in expanded or concreting position in full lines at 24 and 26 respectively, and in collapsed or carrying position in dotted lines at 24' and 26', respectively. The arch form members 24, at least two in number, are arranged in side by side abutting relation and are connected together along their adjacent edges for hinged movement toward and away from each other. The upper arch form elements, also at least two in number, and here illustrated as three in number, are arranged in side by side relation and are connected together along adjacent side edges for hinged movement toward and away from each other.

Figure 1:
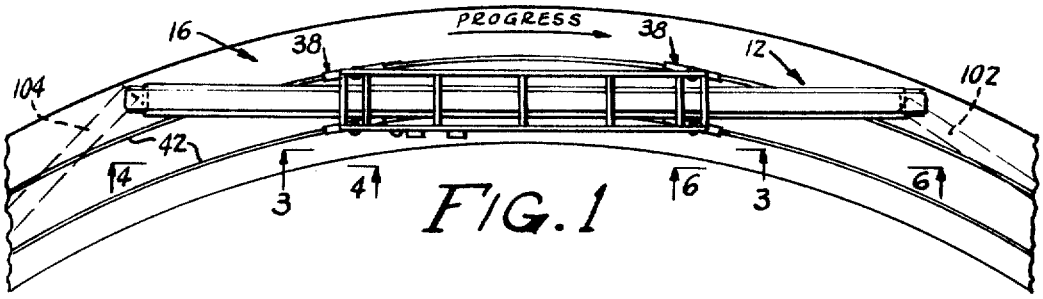
FIGURE 1 is a fragmentary top plan view of an improved tunnel forming apparatus in accordance with the instant inventive concept, showing the traveler means turning a curve in the tunnel and showing in dotted lines portions of the auxiliary conveyor means at each end of the needle beam means.

The traveler means 10 is comprised basically of an inverted U-shaped arch support means 28 at each end having a plurality of upwardly extending laterally spaced legs 30 and an overhead member 32 dimensioned to carry one section of the arch form 26' when it is collapsed. A plurality of vertically spaced longitudinally extending channel members 34 and a plurality of vertically and angularly extending reinforcing members 36 are secured to each other and to the arch support means 28 to complete the basic structural elements of the traveler means 10. Other reinforcing means such as plates 29 may be provided as needed. Each of the arch support means 28 is mounted on a truck or the like 38 having a plurality of wheels 40 ridingly received on rails 42 which form an integral part of each invert form 24 as clearly seen in FIGURE 2. The trucks 38 may swivel with respect to the longitudinal axis of the traveler means 10 as indicated in FIGURE 1 to allow the entire structure to move around curves in tunnel 16. One of the trucks 38 has a conventional drive means such as a hydraulic pump and an electric motor operatively connected to the wheels 40 to drive the same as indicated schematically at 44 in FIGURE 3. Thus, the entire traveler means 10 may be moved forwardly or rearwardly in the tunnel 16 on the rails 42 of the invert forms 24.

A plurality of hydraulically-operated lift cylinders 46 or the like are provided at each end of the traveler means 10 in association with the arch support means 28 and a plurality of hydraulically-operated swing cylinders 48 or the like are provided on each side of the traveler means 10 to lift and expand the collapsed arch form 26' which is formed in three sections hinged at 50, 50 and which has any conventional means (not shown) engageable with the swing cylinders 48 in an obvious manner. These same lift and swing cylinders 46 and 48, respectively, may be used to collapse the arch form 26 and lower it onto the traveler means 10 for repositioning.

Each of the overhead members 32 of the arch support means 28 carries two pairs of depending support members 52 having rotatably mounted roller bearings 54 at their lower ends for slidingly carrying the needle beam means 12. This needle beam means 12 includes a pair of laterally spaced apart I beams 56 having vertically extending elongated central web members 58 and substantially horizontally extending upper and lower flanges 60 and 61, respectively. The upper flanges 60 have lower surfaces which are slightly angular to facilitate sliding support on the roller bearings 54. The lower flanges 61 have upper surfaces which are similarly slightly angular to facilitate slidingly supporting a plurality of hoisting means 62 which have associated therewith two pairs of upwardly extending support arms 64 each carrying rotatably supported roller bearings 66 for riding on the lower flanges 61 of the I beams 56. The hoisting means 62 can be of any conventional form, illustrative embodiments being shown in FIGURES 2 and 8. These hoisting means 62 can be used to collapse, transport and reposition the invert forms 24 in a manner to be more fully described hereinafter and can also be used to move rib steel, tunnel support steel and tunnel support lumber through the forms forwardly towards a heading to support the freshly mined muck.

The invert forms 24 are formed in two sections hinged at 68 and have collapsing means 70 which when lifted by the hoisting means 62 fold the invert forms to the collapsed position 24'.

Figure 3:
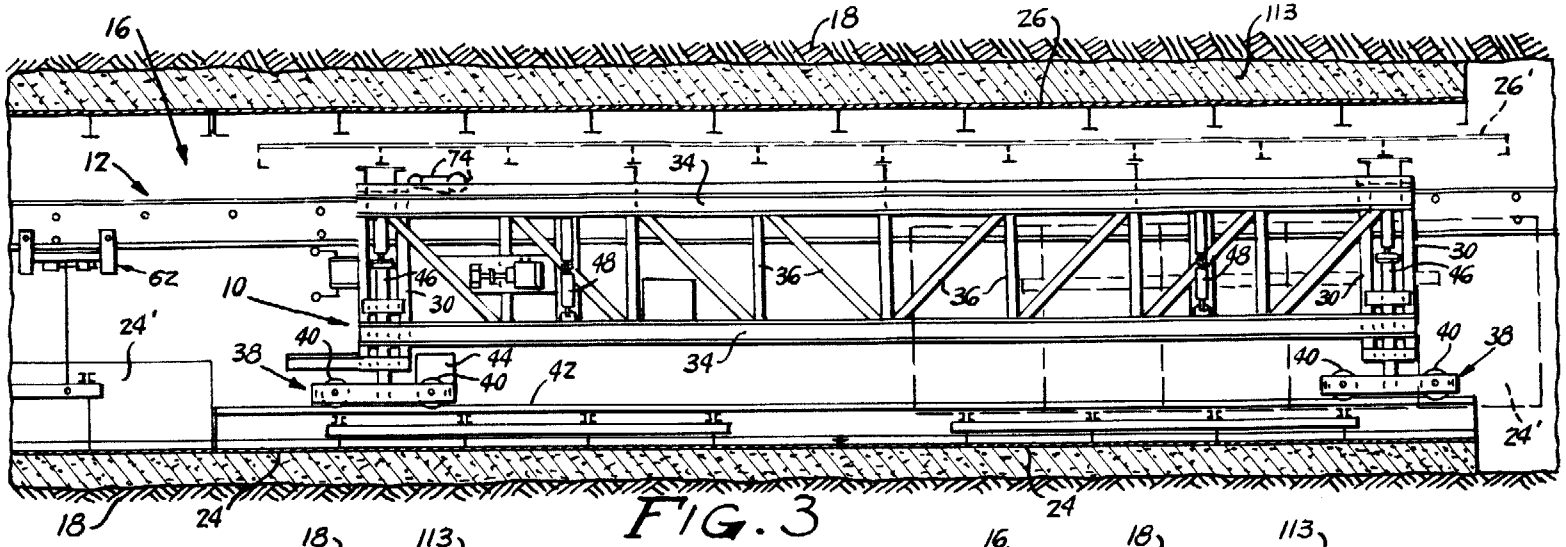
FIGURE 3 is an enlarged fragmentary side elevational view of the central portion of the traveler means taken substantially on line 3—3 of FIGURE 1, also showing a collapsed invert form and a collapsed arch form in carrying position in dotted lines.
Figure 5:
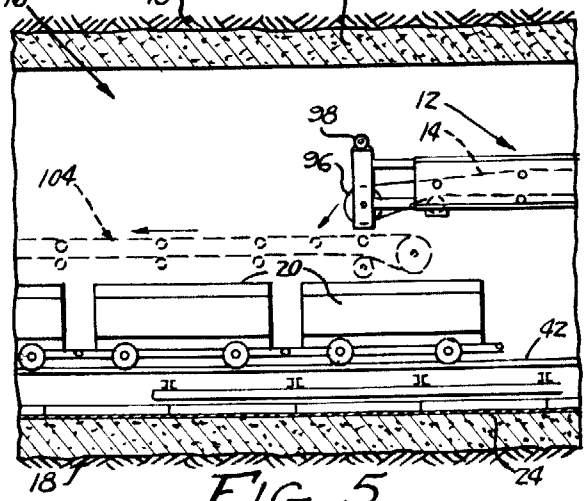
FIGURE 5 is an enlarged fragmentary side elevational view of the rearward end portion of the needle beam means, similar to FIGURE 4, but showing the use of the conveyor means for transporting muck through the traveler means and including in dotted lines an auxiliary conveyor to carry the muck from the rearward end of the needle beam conveyor to a train of muck cars.

A needle beam drive means is shown schematically at 74 in FIGURE 3 and is provided to move the needle beam 12 by sliding the upper flanges 60 of the I beams 56 on their roller bearings 54 in any conventional manner. Likewise, a drive means (not shown) of any conventional form may be provided to slide the hoisting means 62 on the lower flanges 61 of the I beams 56 in an obvious manner.

It is to be understood that for the most part the details of construction of the traveler means 10 and the associated full round form 22 are not the essence of the instant invention, but that the combination of the aforementioned traveler means 10 with the hereinafter described conveyor means 14 form the basis for the inventive concept. Thus, construction details of the traveler means 10 have been set forth only insofar as is necessary for a comprehensive understanding of the improved tunnel digging apparatus.

The needle beam conveyor means 14 is mounted directly between the I beams 56 of the needle beam means 12 and will provide the muck transporting function without the necessity of constant assembly and disassembly and without requiring additional area in which to operate the traveler means 10. The construction of the conveyor means 14 is only critical insofar as it is designed particularly for use in combination with the needle beam means 12 and therefore must be made to conserve space while producing an efficient transportation of muck.

Figure 2:
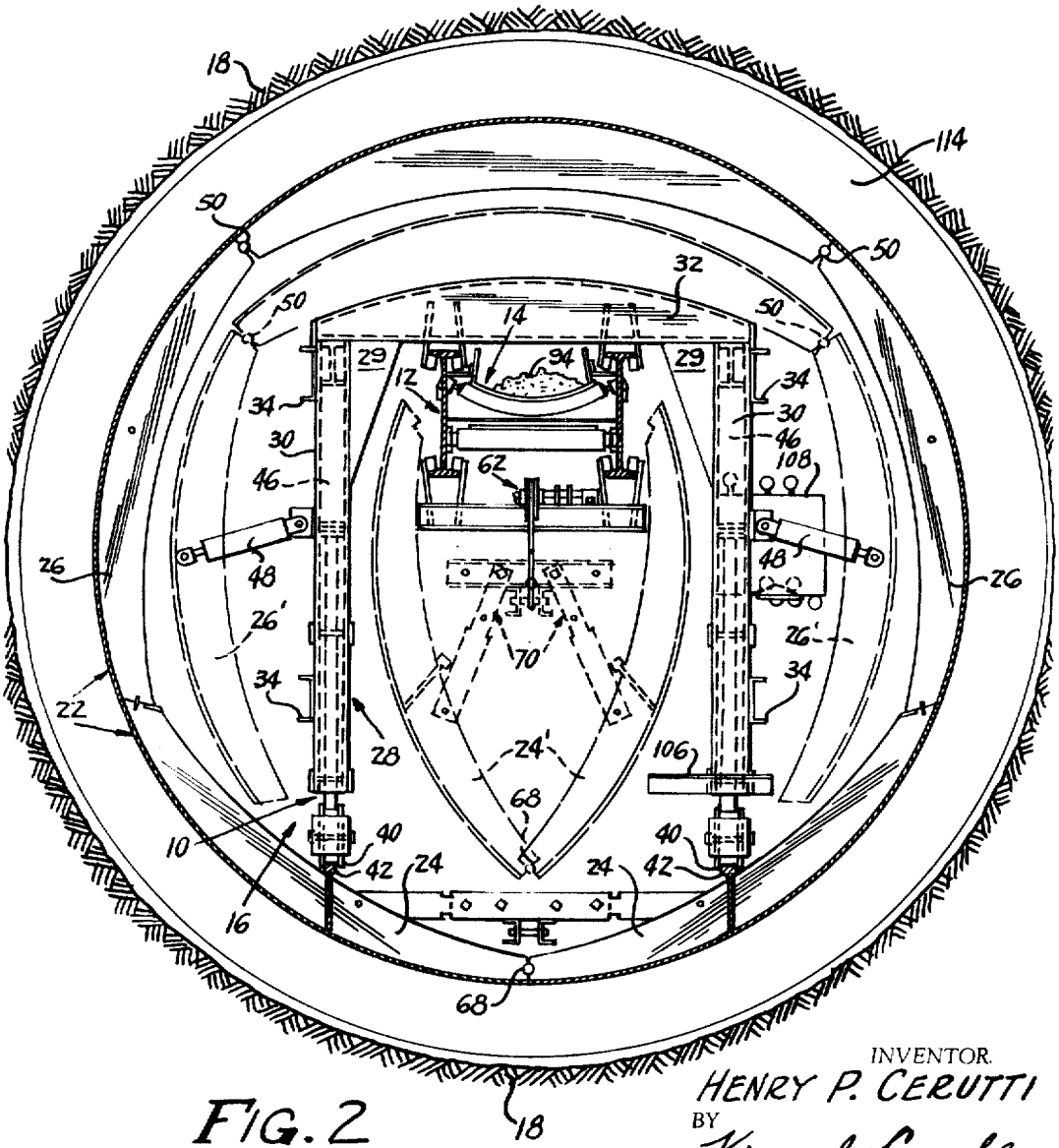
FIGURE 2 is an enlarged cross-sectional view looking rearwardly and taken through the forward end portion of the needle beam means of a traveler means in accordance with this invention passing through a relatively straight portion of the tunnel, with a collapsed invert form and a collapsed arch form shown in carrying position in dotted lines.

A preferred form of conveyor means 14 is shown particularly in FIGURES 2 and 8 and is comprised of an endless flexible belt 76 having an upper pass 78 and a lower pass 80 slidingly supported on a plurality of spaced upper catenary idlers 82 and lower return idlers 84, respectively. The catenary idlers 82 are mounted on support elements 86 suitably spaced and secured preferably exterior to the I beam web members 58 in any conventional manner. Similarly return idlers 84 are rotatably supported on support elements 88 secured internally of the web members 58 of the I beams 56. Suitable continuous laterally spaced splash plates 90 are secured by braces 92 to the I beam webs 58 and act to retain the muck 94 on the upper pass 78 of the belt 76. The endless belt 76 is trained over rotatably mounted rollers 96 or the like at each end of the needle beam means 12 and a conventional drive means 98 is provided at one end to maintain the endless belt moving when desired.

At the forward or loading end of the needle beam conveyor means 14 an additional pair of laterally spaced sideboards 100 in the form of a hopper or the like may be provided as shown in FIGURES 6 and 7 to facilitate receiving the muck from the mining machines (not shown) or from an auxiliary conveyor means 102 shown in dotted lines in FIGURE 7 which carries the muck from mining machine in the direction of the arrows and dumps the same onto the needle beam conveyor means 14 within the sideboards 100.

An additional auxiliary conveyor means 104 may be provided at the rearward end of the needle beam conveyor means 14 to receive the muck therefrom and carry it rearwardly in the tunnel 16 so that additional muck cars 20 may be included in the train. Of course, it is apparent that the needle beam conveyor means 14 may receive the muck directly from the mining machine (not shown) and may carry it directly to one of the muck cars 20 if the operation is comparatively small and the auxiliarly conveyors 102 and 104 are not necessary.

The use and operation of the improved apparatus for forming a tunnel will now be apparent. During the mining shift, the mining machine (not shown) will dig earth or muck from the forward end of the tunnel 16 and will dump the same either onto the auxiliary conveyor means 102 or directly onto the needle beam conveyor means 14. The traveler means 10 will remain stationary during the entire mining operation and the needle beam 12 is moved forward during the mining operation to stay with the advancing mining machine. A plurality of the muck cars 20 are positioned beneath the needle beam means 12 with the rearwardmost car (not shown) either directly under the rearward end of the needle beam conveyor 14 or under the rearward end of the auxiliary conveyor 104 to receive the muck. After the rearwardmost car has been filled the train moves rearward in the tunnel 16 one car length and fills the next car, in a step-by-step process until the full train is loaded. The loaded train then moves rearward in the tunnel 16 over a passing switch (not shown) and allows a second train (not shown) to pull in immediately for loading. This, of course, eliminates the time and manpower necessary with prior art structures wherein each muck car was brought up through the traveler means to the mining machine and then pushed back by hand and switched singly to make up a train to be hauled back to the portal or shaft for lifting out of the tunnel.

Figure 4:
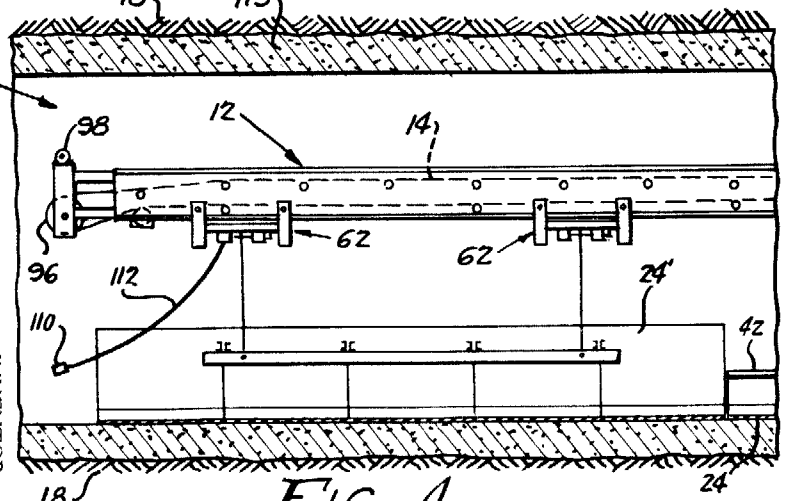
FIGURE 4 is an enlarged fragmentary side elevational view of the rearward end portion of the needle beam means including a conveyor means in accordance with the instant invention, showing the use of the needle beam means in lifting and collapsing an invert form.

The traveler means 10, without modifications, may be used in the subsequent shift to concrete the portion of the tunnel 16 previously dug by the mining machine. The traveler means 10 is moved forward until its rearward end has passed the rearwardmost invert form 24 and the hoist means 62 are then moved rearwardly on the lower flanges 60 of the I beams 56 until they are positioned over the rearwardmost invert form. The operator (not shown) stands on a platform 106 and has access to a control box 108 to operate each of the driving elements of the traveler means 10. Control means 110 extend from the hoist means 62 through a flexible means 112 for easy access by the operator. When the hoist means 62 are positioned over the rearwardmost invert form 24 as shown in FIGURE 4 they are used to lift and collapse the invert form to the carrying position 24' as explained hereinbefore. This collapsed invert form 24' is then moved forwardly on the needle beam means 12 until it is positioned forwardly of the traveler means 10 as shown in FIGURE 6. The invert form is then expanded and placed in the forward part of the tunnel 16. One section of the arch form 26 is then collapsed and supported on the traveler means 10 as explained hereinbefore and the traveler means 10 is moved forwardly on the tracks 42 of the newly-laid invert 24. The hoist means 62 are then moved rearwardly again to pick up the next rearwardmost invert form 24 and collapse the same, move it forwardly and reposition it in front of the traveler means 10 as before described. The traveler means 10 is then again moved forwardly and the collapsed arch form 26' is repositioned at the forward end of the tunnel 16. The arch forms 26 are preferably twice as long as the invert forms 24 so that when one arch form has been repositioned the full round form will be provided for placing the concrete 113 in the space 114 between the outer wall of the forms 24 and 26 and the inner wall of the recently dug out earth 18. This procedure is repeated until the entire portion of the tunnel recently mined has been concreted. Then the mining operation is resumed and a new portion of the tunnel 16 is begun. By this method the apparatus provided herein can be used for both the mining and muck removing operation and the form laying and concreting operation.

It will now be seen that there is herein provided an apparatus for forming tunnels which satisfies all the objectives of the instant invention and others including many advantages of great practical utility and commercial importance.

Since many embodiments may be made of the instant inventive concept and since many modifications may be made of the embodiments hereinbefore shown and described, it is to be understood that all matter herein is to be interpreted merely as illustrative and not in a limiting sense.

I claim:

1. An apparatus for *forming a tunnel including means for* progressively placing and removing concrete forms in a tunnel opening comprising a plurality of floor sections, said sections being identical and each including a pair of invert arch form members arranged in side by side relation with respect to each other and connected together along their adjacent sides for hinged movement toward and away from each other, a rail extending along each said member from one end to the other end and disposed in parallel spaced relation with respect to said adjacent sides, said sections being adapted to be laid in the form of a tunnel with the members of each section in the away position and with siad sections in end to end abutting relation so that said rails form a continuous trackway along said tunnel form, a tunnel-shaped carriage having a forward end and a rearward end, said carriage having spaced side walls and a roof extending over the upper ends of said side walls, a wheel on the lower end of each of said side walls adjacent each end of the latter, said wheels rollably supporting said carriage on said trackway when said sections are in the laid position, an overhead track positioned between said side walls adjacent the upper ends thereof and extending longitudinally of said carriage, said tracks being dependingly carried by said roof and having a portion adjacent one end exteriorly of said forward end of said carriage and having a portion adjacent the other end exteriorly of said rearward end of said carriage, [and] hoist means carried by said track for rolling movement between said one and other track ends, said means being operable to lift each of said sections in turn when on the floor of said tunnel, fold the members of said section to the toward position, transport said folded section through said carriage from the rearward end to the forward end, and lower and support said section in a position adjacent to and above the tunnel floor with said members in the away position so as to provide a form for casting concrete between said section and the tunnel floor [.], *and conveyor means carried by said overhead track for transporting muck from the forward end of said carriage to the rear end thereof.*

2. The apparatus according to claim 1 in which each of said invert arch form members is shaped to a segment of a circle.

3. An apparatus for *forming a tunnel including means for* progressively placing and removing concrete forms in a tunnel opening comprising a plurality of floor sections, said sections being identical and each including a pair of invert arch form members arranged in side by side relation with respect to each other and connected together along their adjacent sides for hinged movement toward and away from each other, a rail extending along each said member from one end to the other end and disposed in parallel spaced relation with respect to said adjacent sides, said sections being adapted to be laid in the form of a tunnel with the members of each section in the away position and with said sections in end to end abutting relation so that said rails form a continuous trackway along said tunnel form, a tunnel shaped carriage having a forward end and a rearward end, said carriage having spaced side walls and a roof extending over the upper ends of said side walls, a wheel on the lower end of each of said side walls adjacent each end of the latter, said wheels rollably supporting said carriage on said trackway when said sections are in the laid position, an overhead track positioned between said side walls adjacent the upper ends thereof and extending longitudinally of said carriage, said track being dependingly carried by said roof, and having a portion adjacent one end exteriorly of said forward end of said carriage and having a portion adjacent the other end exteriorly of said rearward end of said carriage, and hoist means carried by said track for rolling movement between said one and other track ends, said means being operable to lift each of said sections in turn when on the floor of said tunnel, fold the members of said section to the toward position, transport said folded section through said carriage from the rearward end to the forward end, and lower and support said section in a position adjacent to and above the tunnel floor with said members in the away position so as to provide a form for casting concrete between said section and the tunnel floor, a plurality of wall sections, said wall sections being identical and each including at least a pair of upper arch form elements arranged in side by side relation with respect to each other and connected together along their adjacent side edges for hinged movement from collapsed positions to extended positions, means for effecting upward and downward movement of said roof relative to said wheels, said roof being adapted to support thereon a wall section with portions of the elements thereof exteriorly of said carriage side walls when said elements are in the collapsed position, [and] other hoist means on said carriage side walls for shifting said wall section elements outwardly toward the walls of said tunnel opening simultaneously with upward movement of said roof so as to position said wall section elements in extended position adjacent to and spaced from the walls of said tunnel opening to provide another form for casting concrete between said another form and said tunnel opening wall and between said another form and the tunnel opening roof[.], *and conveyor means carried by said overhead track for transporting muck from the forward end of said carriage to the rear end thereof.*

4. The apparatus according to claim 3 in which each of said upper arch form elements is shaped to a segment of a circle.

*5. The structure of claim 1 wherein said overhead track includes a pair of longitudinally extending spaced I beams and said conveyor means comprises an endless belt carried by supports laterally extending between said I beams, and means for moving said belt.*

*6. The structure of claim 1 wherein said endless belt has an upper pass and a lower pass, said upper pass being slidably supported on a plurality of longitudinally spaced transverse catenary idlers and said lower pass being slidably supported on a plurality of longitudinally spaced transverse return idlers.*

*7. The structure of claim 6 wherein supports extending inwardly from confronting sides of said I beams carry a pair of continuous splash plates immediately above said upper pass adjacent each side edge of said endless belt over at least a portion of said conveyor means.*

*8. The structure of claim 7 wherein laterally spaced sideboards are mounted on the tops of said I beams above said upper pass of said endless belt adjacent the forward end of said conveyor means.*

*9. The structure of claim 1 wherein a first auxiliary conveyor means is provided adjacent the forward end of said conveyor means for carrying muck from a mining machine to said forward end of said conveyor means.*

*10. The structure of claim 9 wherein a second auxiliary conveyor means is provided adjacent the rearward end of said conveyor means for transporting muck from said conveyor means to a muck car.*

References Cited by the Examiner

The following references, cited by the Examiner, are of record in the patented file of this patent or the original patent.

UNITED STATES PATENTS

| | | | |
|---|---|---|---|
| 1,338,237 | 4/1920 | Mack | 61—84 |
| 1,505,060 | 8/1924 | Quayle | 61—84 |
| 1,734,773 | 11/1929 | Murray | 61—43 X |
| 1,843,334 | 2/1932 | McGrath | 61—84 X |
| 2,111,405 | 3/1938 | Parker | 61—84 |
| 2,128,172 | 8/1938 | Warner et al. | 61—84 |
| 2,385,251 | 9/1945 | Ayers | 61—42 |
| 2,764,872 | 10/1956 | Budd | 61—84 |

FOREIGN PATENTS

| | | |
|---|---|---|
| 949,872 | 2/1949 | France. |
| 1,163,356 | 4/1958 | France. |
| 896,367 | 11/1953 | Germany. |

CHARLES E. O'CONNELL, *Primary Examiner.*

JACOB SHAPIRO, *Examiner.*